No. 773,273. PATENTED OCT. 25, 1904.
H. J. BAYARD.
RAILWAY CAR.
APPLICATION FILED MAR. 4, 1904.
NO MODEL. 2 SHEETS—SHEET 1.
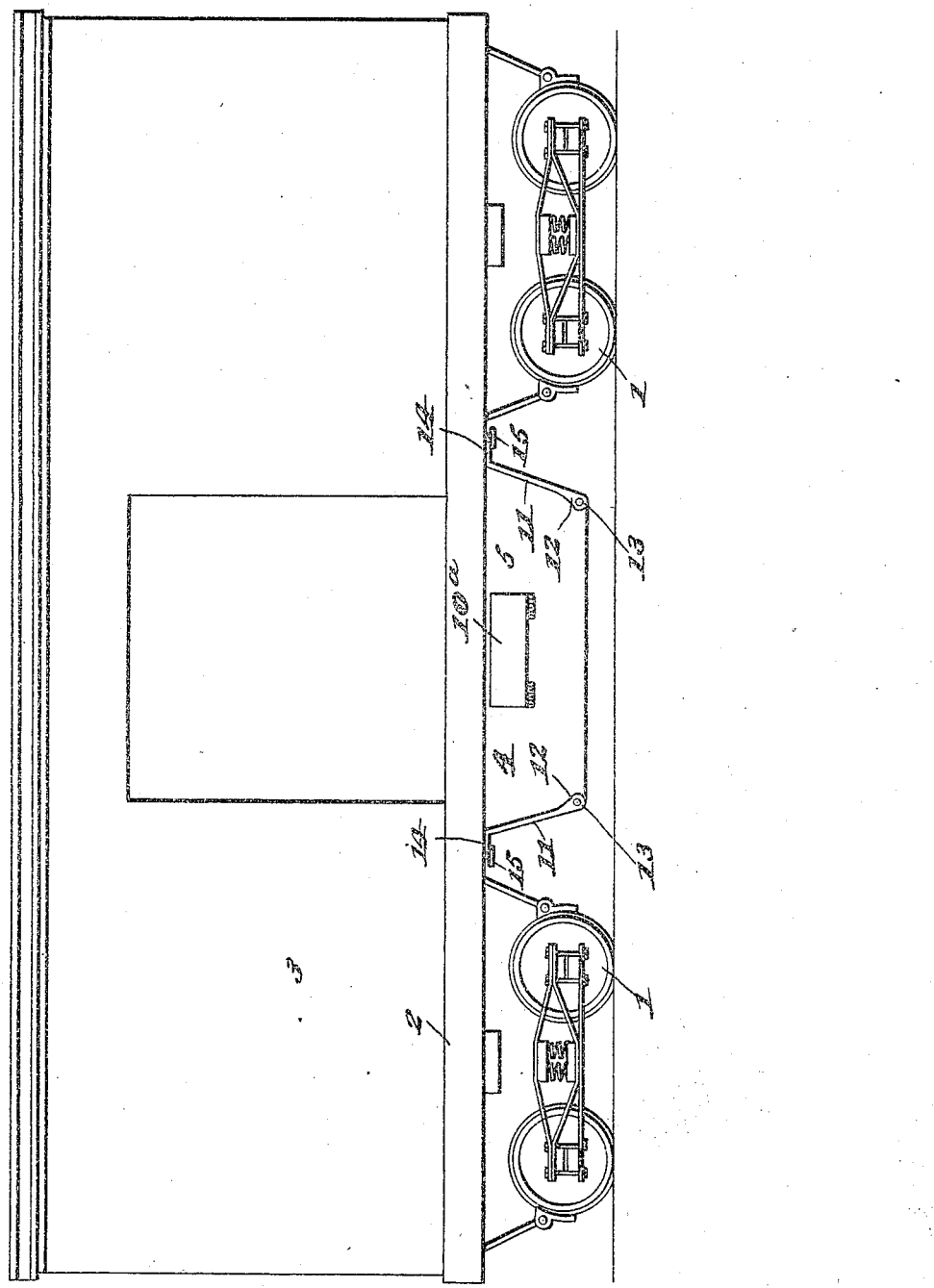

No. 773,273. PATENTED OCT. 25, 1904.
H. J. BAYARD.
RAILWAY CAR.
APPLICATION FILED MAR. 4, 1904.
NO MODEL. 2 SHEETS—SHEET 2.
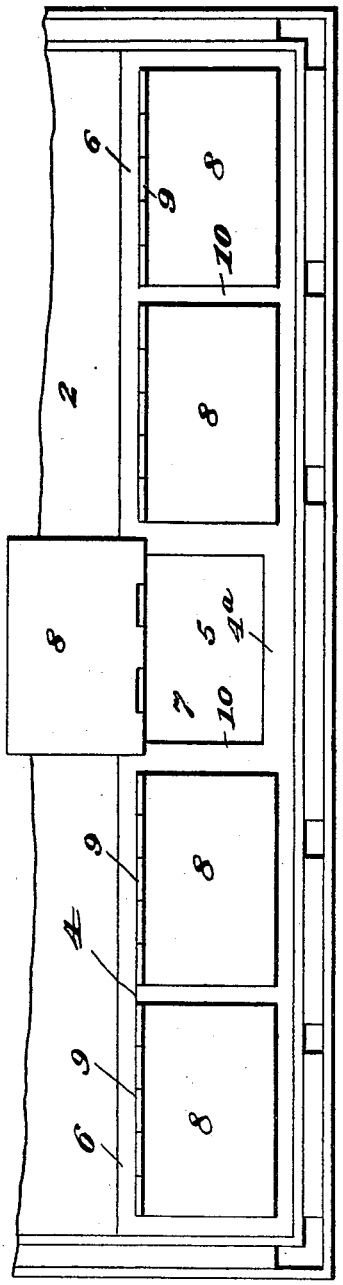
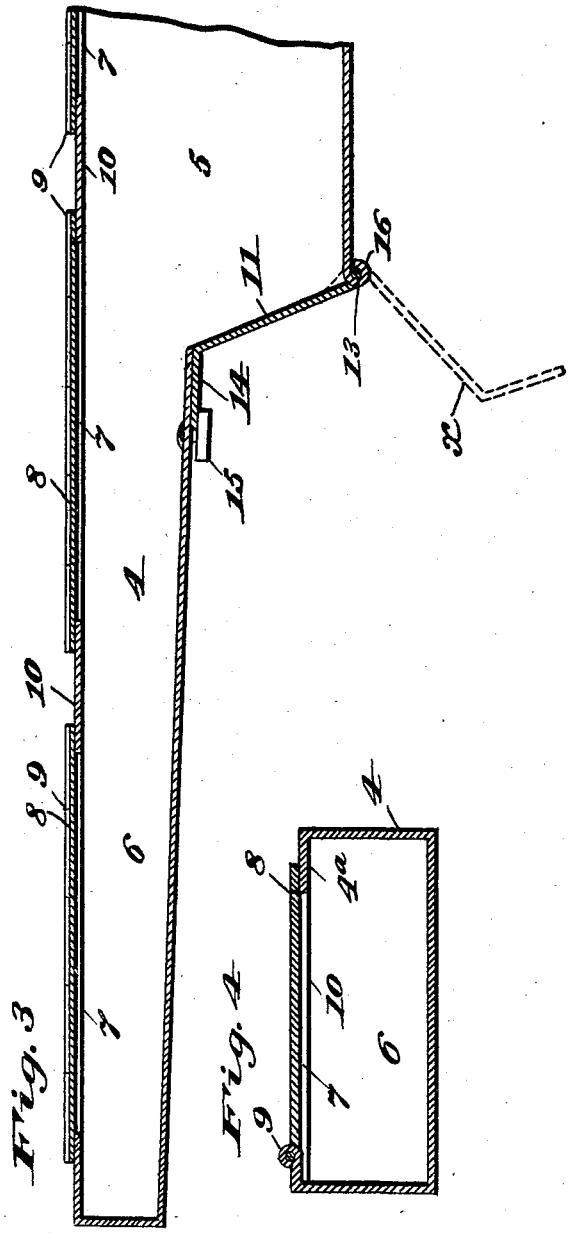

No. 773,273. Patented October 25, 1904.

UNITED STATES PATENT OFFICE.

HYRAM J. BAYARD, OF CHICAGO, ILLINOIS.

RAILWAY-CAR.

SPECIFICATION forming part of Letters Patent No. 773,273, dated October 25, 1904.

Application filed March 4, 1904. Serial No. 196,528. (No model.)

*To all whom it may concern:*

Be it known that I, HYRAM J. BAYARD, a citizen of the United States of America, and a resident of Chicago, Cook county, Illinois, have invented certain new and useful Improvements in Railway-Cars, of which the following is a specification.

This invention relates to certain improvements in railway freight-cars, and has for its object to provide a car of an improved and simplified construction which shall be at once strong and inexpensive and shall be capable of use for the transportation of freight of various kinds at the same time.

The invention consists in certain novel features of the construction, combination, and arrangement of the several parts of the improved freight-car whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate my invention, Figure 1 is a side elevation showing a freight-car constructed according to my invention; and Fig. 2 is a partial plan view of the platform of the car, the body thereof being detached. Fig. 3 is an enlarged partial section taken longitudinally and vertically through the freight-receiving tank at one side of the improved car. Fig. 4 is a sectional view taken transversely through the said tank and showing the hinged cover for closing the upper inlet thereof.

As shown in the views, 1 indicates the car-trucks, and 2 the platform, which is constructed in a well-known way with openings to receive stakes (not shown) extended down from the body 3, so as to permit of removing one form of body and replacing it with another.

Along the side of the platform and embedded at its upper part therein is a metallic tank or freight-receptacle having shallow end portions 6 6 (seen in Fig. 2) and provided with a deeper central portion 5, depending beneath the platform in the space between the trucks 1 1. The top of the tank 4 is flush with the floor of the platform 2 of the car and is provided at suitable intervals with openings 7 7, adapted to be opened for the filling of the tank with freight and which are also adapted to be closed by means of hinged doors 8 8, the hinges of which are seen at 9 on the drawings. Between the door-openings 7 7 are arranged strips 10, extended transversely across the top of the tank and on which the ends of the doors 8 rest, as seen in Figs. 2 and 3, to give strength to the structure.

The deeper central portion 5 of the tank 4 is provided at its upper part with a hinged door $10^a$, closing an opening central in said part of the tank and through which a charge may be inserted in said tank when the car-door is locked or when the car is filled with freight, and at the ends of said deeper central portion 5 of the tank are openings designed to be closed by hinged covers 11 11, having lower portions 12, pivoted, as seen at 13, to the bottom of the said part 5 of the tank and having their upper parts 14 adapted to lie against the under side of the shallow end portions 6 6 of the tank when said covers are closed, as seen in Figs. 1 and 3, with edges adapted to be engaged over turn-buttons 15 or similar securing devices extended down from said portions 6 of the tank.

In practice there will be a tank 4 along each side of the platform, and the said tanks may be filled with solid freight—as, for example, grain or coal—through the openings 7 in the platform when the car is otherwise empty or through the opening $10^a$ in the side of the tank when the car is closed or loaded, and when it is desired to withdraw the load from the tanks the end doors 11 thereof may be opened, so that the grain, coal, or other freight may be discharged from the tanks, the covers or doors 11 swinging pivotally downward, as seen in dotted lines at *x* in Fig. 3.

From the above description it will be seen that the improved car constructed as above described is of an extremely simple, strong, and inexpensive nature and is especially well adapted for use by reason of its adaptability for transportation of freight of various kinds at the same time, and it will also be obvious from the above description that the device is capable of considerable modification without material departure from the principles and spirit of the invention, and for this reason I do not wish to be understood as limiting myself to the precise form and arrangement of the several parts of the device as herein set forth in carrying out my invention in practice.

Having thus described my invention, what I claim, and desire to secure by Letters Patent, is—

1. A railway freight-car having a platform in which are embedded tanks which extend downward below the central part of the platform and are provided in their upper parts with filling-openings and at their lower parts with openings located at the ends of said downwardly-extended parts of the tanks for the withdrawal of the freight therefrom, said downwardly-extended parts of the tanks having hinged doors adapted to close said openings and provided with fastening means.

2. A railway freight-car the platform of which has embedded in it a tank extended down beneath the central part of the platform with a filling-opening at its top and with open ends, doors hinged upon the ends of the downwardly-extended part for closing the openings therein and fastenings for said doors.

3. A railway freight-car the platform of which has embedded in it a tank extended down beneath the central part of the platform with its top flush with the platform-floor and provided with filling-openings having doors for closing them, the side of said downwardly-extended part of the tank below the platform having also a central filling-opening provided with a door and the ends of the said downwardly-extended part of the tank having discharge-openings provided with hinged doors.

Signed at Chicago, Illinois, this 9th day of February, 1904.

HYRAM J. BAYARD.

Witnesses:
J. D. CAPLINGER,
C. S. KELLEY.